United States Patent
Felknor (10) Patent No.: US 7,845,112 B2
(45) Date of Patent: *Dec. 7, 2010

(54) PLANT RETAINER FOR RETAINING A PLANT FOR GROWTH FROM THE SIDE OR BOTTOM OF A PLANTER

(75) Inventor: Wilson A. Felknor, Lenoir City, TN (US)

(73) Assignee: Felknor Ventures LLC, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/655,429

(22) Filed: Dec. 30, 2009

(65) Prior Publication Data

US 2010/0199553 A1    Aug. 12, 2010

Related U.S. Application Data

(62) Division of application No. 12/322,904, filed on Feb. 9, 2009, now Pat. No. 7,669,366.

(51) Int. Cl.
A47G 7/02 (2006.01)
(52) U.S. Cl. .................................... 47/65.8
(58) Field of Classification Search .............. 47/65.8
See application file for complete search history.

(56) References Cited

U.S. PATENT DOCUMENTS

| | | | | |
|---|---|---|---|---|
| 2,923,292 A | * | 2/1960 | Dorr | 128/894 |
| 3,524,193 A | * | 8/1970 | Auletta | 343/895 |
| 3,733,745 A | | 5/1973 | Ingerstedt et al. | |
| 3,744,060 A | | 7/1973 | Bellhouse et al. | |
| 3,820,200 A | * | 6/1974 | Myers | 24/30.5 S |

(Continued)

FOREIGN PATENT DOCUMENTS

CA    2082126    5/2000

(Continued)

OTHER PUBLICATIONS

Declaration of John Mueller in Support of Defendant's Memorandum in Opposition, Dist.Ct,NY, Civil No. 1:10-cv-2733,May 21, 2010 with Exhibits D (Invalidy Claim Chart),E (Decl) &F(Definions).

(Continued)

*Primary Examiner*—Francis T Palo
(74) *Attorney, Agent, or Firm*—Michael E. McKee (57) ABSTRACT

A planter for growing a transplantable plant includes a container having a sidewall and a bottom and further includes a retainer member for retaining a plant which has been transplanted within the container through the sidewall or bottom thereof. The retainer member defines an expandable opening which is movable between expanded and normally-collapsed conditions so that by urging a plant root system end-first against the retainer member, the expandable opening is moved to an expanded condition to permit the root system to pass through the expandable opening into the container interior. Upon passage of the root system through the expandable opening, the expandable opening is permitted to return toward its normally-collapsed condition about the stem of the plant to thereby prevent the withdrawal of the root system of the plant from the container interior through the plant retainer.

21 Claims, 7 Drawing Sheets

U.S. PATENT DOCUMENTS

| | | | |
|---|---|---|---|
| 4,404,767 | A | 9/1983 | Enrich |
| 4,454,684 | A | 6/1984 | O'Hare |
| D278,614 | S | 4/1985 | Moss |
| 4,920,695 | A | 5/1990 | Garden |
| 4,986,027 | A | 1/1991 | Harvey |
| 5,010,686 | A | 4/1991 | Rivest |
| 5,031,359 | A | 7/1991 | Moffett, Jr. |
| 5,142,820 | A | 9/1992 | Aquino |
| 5,333,409 | A | 8/1994 | Mendes |
| 5,342,316 | A | 8/1994 | Wallace |
| 5,363,594 | A | 11/1994 | Davis |
| 5,381,625 | A | 1/1995 | Wente |
| D363,896 | S | 11/1995 | Bergmann |
| 5,715,629 | A | 2/1998 | Hawkins |
| D396,201 | S | 7/1998 | Lashlee |
| 5,857,575 | A * | 1/1999 | Watson et al. .................. 211/40 |
| 6,041,546 | A | 3/2000 | Baranova |
| 6,058,651 | A | 5/2000 | Perez |
| D429,661 | S | 8/2000 | Yano |
| 6,138,410 | A | 10/2000 | Oglevee |
| 6,298,600 | B1 | 10/2001 | Feldman |
| 6,532,594 | B1 * | 3/2003 | Barnett ............................ 2/20 |
| 6,874,278 | B2 | 4/2005 | Felknor et al. |
| 7,171,782 | B2 | 2/2007 | Felknor et al. |
| 7,249,991 | B1 * | 7/2007 | Watson ....................... 446/220 |
| 7,669,366 | B2 * | 3/2010 | Felknor ....................... 47/65.8 |
| 2003/0150159 | A1 | 8/2003 | Kennedy |
| 2004/0103583 | A1 | 6/2004 | Eriksen et al. |
| 2005/0252923 | A1 * | 11/2005 | Woolf ........................ 220/731 |
| 2006/0096170 | A1 | 5/2006 | Wright |

FOREIGN PATENT DOCUMENTS

| | | |
|---|---|---|
| CA | 2309894 | 11/2001 |
| GB | 943717 | 12/1963 |
| GB | 2147484 | 5/1985 |
| GB | 2152345 | 8/1985 |
| GB | 2257885 | 1/1993 |
| JP | 2000-069854 | 5/1991 |
| JP | 2004141174 | 5/2004 |
| WO | 2008143525 | 11/2008 |

OTHER PUBLICATIONS

Order of Honorable Paul A. Crotty, Dist.Ct,NY, Civ. 2733 Jun. 23, 2010.

* cited by examiner

PLANT RETAINER FOR RETAINING A PLANT FOR GROWTH FROM THE SIDE OR BOTTOM OF A PLANTER

This is a divisional application of application Ser. No. 12/322,904 filed Feb. 9, 2009, now U.S. Pat. No. 7,669,366, and the entire disclosure of which is incorporated herein by reference.

BACKGROUND OF THE INVENTION

This invention relates generally to gardening accessories and relates, more particularly, to a planter within which plants are transplanted for growth.

The type of planter with which this invention is concerned includes those which are adapted to contain dirt or potting soil and into which a transplantable plant can be transplanted so that the plant continues its growth within the planter.

U.S. Pat. No. 7,171,782, on which I was named as a co-inventor, describes a planter which is adapted to be hung from an overhead support structure and into which multiple plants can be transplanted for growth out the sides of the planter. Such a planter is advantageous in that it enables multiple plants to be grown in an elevated condition above the ground (and thereby prevent the exposure of the plants, or the fruit thereof, to ground-related problems) without the need for appreciable space (e.g. ground space) for growing the plants.

It would be desirable to provide an improved planter for growing a plant or multiple plants in an elevated condition above the ground which embodies alternative means for holding the roots of a plant within the planter for growth of the stem of the plant out of the planter.

Accordingly, it is an object of the present invention to provide a new and improved planter for growing a plant or multiple plants in an elevated condition above the ground.

Another object of the present invention to provide such a planter having a container within which plants can be grown out the side or bottom thereof and including improved means for retaining the roots of the plants within the container.

Yet another object of the present invention is to provide such a planter whose grow ports enable plants to be transplanted into the container of the planter relatively quickly.

Still another object of the present invention is to provide such a planter which is uncomplicated in structure, yet effective in operation.

One more object of the present invention is to provide a plant retaining means which can be utilized in conjunction with a grow port formed in a side or bottom of a planter for retaining a plant within the container for growth out of the grow port of the container.

SUMMARY OF THE INVENTION

This invention resides in an improvement for a planter within which a transplantable plant having a stem and a root system is desired to be transplanted for growth and wherein the planter includes a container defining a sidewall or a bottom and an interior.

The improvement is characterized in that there is incorporated within the container a means for retaining the root system of a plant which has been transplanted within the container. The retaining means defines an expandable opening which is movable between an expanded condition and a normally-collapsed condition so that by urging a transplantable plant root system-first against the plant retaining means from the exterior of the container, the expandable opening is moved to an expanded condition from its normally-collapsed condition to permit the root system to pass through the expandable opening into the container interior. Upon passage of the root system of the plant through the expandable opening as aforesaid, the expandable opening is permitted to return toward its normally-collapsed condition about the stem of the transplantable plant to thereby prevent the withdrawal of the root system of the plant from the container interior through the plant retaining means.

DETAILED DESCRIPTION OF AN ILLUSTRATIVE EMBODIMENT

Figures 1, 2, 3:
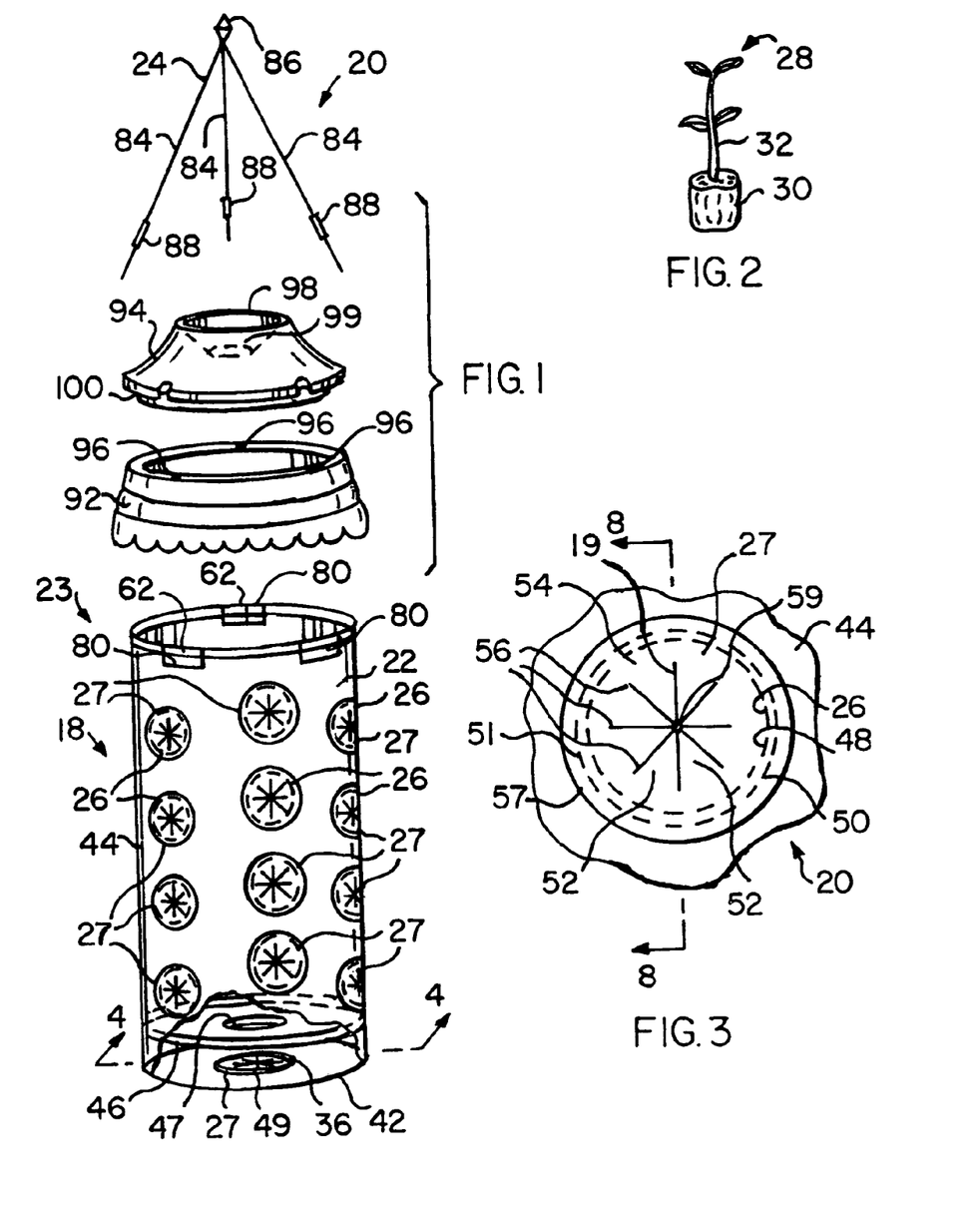
FIG. 1 is a perspective view of one embodiment of a planter within which features of the present invention are embodied and shown exploded and partially cut-away.
FIG. 2 is a perspective view of an example of a plant capable of being transplanted within the FIG. 1 planter for continued growth of the plant.
FIG. 3 is a fragmentary view of the side of the FIG. 1 planter assembly.

Turning now to the drawings in greater detail and considering first FIG. 1, there is illustrated an embodiment, generally indicated 20, of a planter within which features of the present invention are incorporated. The planter 20 includes a container 22 within which plants are transplanted for growth and a hanger assembly 24 which facilitates the suspension of the container 22 above a floor or underlying surface.

The container 22 includes wall means, generally indicated 23, having sidewalls 44 and a bottom 42 which define a plurality of openings, or grow ports, through which transplanted plants are permitted to grow. Most of these container openings are provided by side grow ports 26 which open out of the sidewalls 44 of the container 22, while one container opening is provided by a bottom grow port 36 which opens out of the container bottom 42. Furthermore, there is associated with each grow port 26 or 36 a plant retaining means, generally indicated 18, in the form of a retainer member 27, described herein, having a body which is adapted to hold a plant within the container 22 for growth out of the side or bottom of the container 22. In connection with the foregoing, each retainer member 27 is used with a corresponding plant for supporting the plant for growth out the side or bottom of the container 22 through the grow ports 26 or 36.

With reference to FIG. 2, there is illustrated an example of a plant 28 which is capable of being transplanted within the container 22 of the planter 20 for continued growth therein. The depicted plant 28 includes a root system 30 (which commonly is encased in an amount, or ball, of dirt) and a stem 32 which extends from the root system 30. As will be apparent herein and in order to transplant the plant 28 through one of the planter grow ports 26 or 36, described herein, the plant 28 is directed root system-first into the grow port 26 or 36 until the root system 30 is completely moved through, or clears, the retainer member 27 and is positioned within the interior of the container 22. The retainer member 27 thereafter prevents the withdrawal of the root system 30 from the grow port 26 or 36 so that the plant 28 is in a secured condition within the grow port 26 or 36 while the plant stem 32 either extends laterally, or outwardly to the side, of the sidewall of the container 22 through a side grow port 26 or extends downwardly of the container 22 through the bottom grow port 36. With the plant 28 secured within the container 22 in this manner, the planter 20 accommodates the continued growth of the plant 28 while its stem 32 extends through the side grow port 26 or the bottom grow port 36.

With reference again to FIG. 1, the container 22 is in the form of an elongate bag 40 constructed, for example, of a flexible plastic material whose bottom and sidewalls provide the bottom 42 and sidewalls 44 of the container 22 and which, when filled with dirt or potting soil to the expanded condition, as depicted in FIG. 1, provides the bag 40 with a substantially cylindrical form. To help preserve the cylindrical form of the bag 40 when filled with dirt or potting soil, a stiff, circular plate 46 (FIG. 1) having a center opening 47 can be positioned within the bottom 42 of the bag 40 so that the center opening 47 is aligned with the bottom grow port 36. Defined along the sidewalls 44 are a plurality of circular openings 48 (FIG. 3) which provide the side grow ports 26 and which provide access to the interior of the bag 40 through the sidewalls 44 thereof, and there is defined within the bottom 42 a circular opening 49 (FIG. 1) which provides the bottom grow port 36 which provides access to the interior of the bag 40 through the bottom 42 thereof.

Within the bag 40 of the depicted container 22, there are defined twenty-one sidewall openings, or side grow ports 26, which are regularly disposed about the bag sidewalls 44 and there is defined one bottom opening, or bottom grow port 36 disposed centrally therein. It will be understood, however, that a planter which embodies features of the present invention can include an alternative number of side or bottom grow ports 26 or 36.

Furthermore, it will also be understood that although the depicted container 22 has substantially vertically-disposed sidewalls 44 within which the grow ports 21 are positioned and a horizontally-disposed bottom within which the grow port 26 is positioned, a grow port in accordance with the broader aspects of this invention can be incorporated within a sidewall of a container which is not vertically-oriented or in a bottom which is not horizontally-oriented. Accordingly and as used herein, the terms "side", "sidewall" and "bottom" of a container are intended to include every surface of a container in which a grow port which possesses the features described herein can be incorporated, and the principles of this invention can be variously applied.

Figure 4:
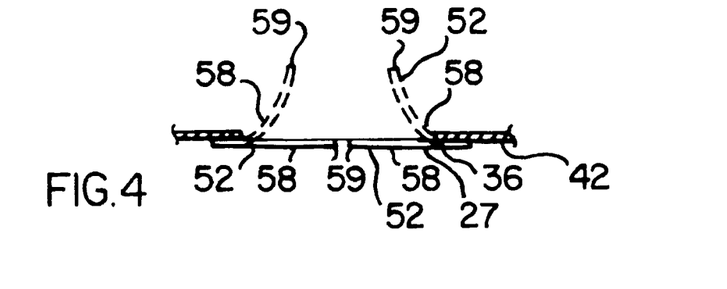
FIG. 4 is a cross-sectional view taken along line 4-4 of FIG. 1.
Figure 8:
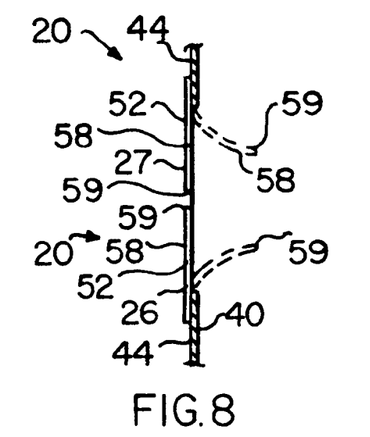
FIG. 8 is a cross-sectional view taken along line 8-8 of FIG. 3.

As best shown in FIGS. 3, 4 and 8, there is associated with each grow port 26 or 36 a retainer member 27 whose body has been attached (e.g. sewn) to the sidewalls 44 or bottom 42 so as to substantially cover a grow port 26 or 36 defined therein. To this end and as exemplified in the FIG. 3 view, each retainer member 27 is comprised of a relatively flat piece 54 of resiliently flexible material having a circular periphery, or outer (i.e. circumferential) edge, 57 and the retainer member 27 is attached (e.g. sewn) to the sidewalls 44 or bottom 42 with stitches 50 which extend along a path adjacent the circular periphery 57 of the member 27. Furthermore, each retainer member 27 is secured to the container 22 about a corresponding grow port 26 or 36 so that one side, or the interior side, face of the retainer member 27 faces the interior of the container 22 while the opposite side, or the exterior side, face of the retainer member 27 faces exterior of the container 22.

Moreover and as will be apparent herein, each retainer member 27 defines an expandable opening, indicated 19 in FIG. 3, which is adapted to be moved between an expanded condition and a normally-collapsed condition so that by urging a transplantable plant 28 root system-first against the plant retainer member 27 from the exterior of the container 22, the expandable opening 19 is moved to an expanded condition from a normally-collapsed condition to permit the plant root system 30 to pass through the expandable opening 19 into the container interior and so that upon passage of the root system 30 through the expandable opening 19, the expandable opening is permitted to return toward its normally-collapsed condition about the stem 32 of the transplantable plant 28 to thereby prevent the withdrawal of the root system 30 of the plant 28 through the plant retainer member 27 from the container interior.

Within the depicted planter 20, each retainer member 27 includes a peripheral portion 51 disposed adjacent the periphery 57 of the retainer member 27 and plurality of finger portions 52 which are integrally joined with and extend inwardly (e.g. radially-inwardly) of the peripheral portion 51 of the retaining member 27 to a tip 59. As best shown in FIG. 3, each finger portion 52 is in the form of a elongated, wedge-shaped section having a larger end which is disposed adjacent the peripheral portion 51 and a smaller end, or tip, disposed adjacent the center of the member 27 and opposite side edges which converge toward one another as a path is traced from the larger end of the finger portion 52 toward the smaller end thereof.

The material out of which the retainer member 27 is formed is preferably a plastic material, such as a thin vinyl material, and the member 27 is severed along substantially straight paths 56 (see FIG. 3) to provide each finger portion 52 with a substantially V or wedge-shaped appearance. Each finger portion 52 includes a free, or unattached, end section 58 which, because of its flexible nature, can be flexed inwardly of the bag 40 from an undeformed (i.e. unflexed), planar condition (as is illustrated, for example, in solid lines in FIGS. 4 and 8) to a flexed condition (as is illustrated, for example, in phantom in FIGS. 4 and 8) and is permitted to return from its flexed condition, under the influence of its inherent resiliency, toward its undeformed condition. Each retainer member 27 of the depicted planter 20 is provided by eight finger portions 52, although an alternative number of finger portions 52 (e.g. three) can be had, and each end section 58 terminates at the tip 59 (rounded in shape) adjacent the center of the retainer member 27.

It follows, therefore, that the finger portions 52 collectively provide the expandable opening 19 for the member 27 which is substantially closed when the finger portions 56 are in their undeformed (i.e. unflexed), planar condition (as is illustrated, for example, in solid lines in FIGS. 4 and 8) and is expandable to provide a substantially larger opening as the finger portions 56 are urged (i.e. moved) from the planar, or unflexed, condition to the flexed condition (as is illustrated, for example, in phantom in FIGS. 4 and 8). Furthermore and due to the inherent resiliency of the retainer member 27, the finger members 56 are continually biased from the flexed condition toward the unflexed condition.

With reference again to FIG. 1, the planter 20 further includes means for cooperating with the hanger assembly 24 with which the container 22 can be suspended from an elevated support so that the planter 20 is rendered as a hanging planter. To this end, the container 22 includes an upper ring 62 which is sewn into the upper edge of the bag 40, and the bag 40 has a plurality of (e.g. three) notches 80 which are spaced about the upper end of the container 22 which provide access to the ring 62. The hanger assembly 24 is attachable to the ring 62 of the container 22 by way of the notches 80 for suspension of the container 22 from an elevated support (not shown). In this connection, the hanger assembly 24 includes a plurality of (e.g. three) cable members 84 which are joined together at one end thereof (i.e. the upper end as seen in FIG. 1) by way of a ring-bearing swivel 86 which is adapted to be looped about a hook (not shown) or similar fastener joined to the elevated support for suspension of the container 22 therefrom. To attach the ends of the cable members 84 (i.e. the cable ends opposite the swivel end thereof) to the container 22, each cable end is passed through a corresponding notch 80, looped around the ring 62 and then attached to itself with a clamp 88. With the cable members 84 attached to the ring 62 in this manner, the container bag 40 can be suspended by the cable members 84 and swivel 86.

The planter 20 also includes a decorative rim member 92, best shown in FIG. 1, which is positionable atop the container 22 and which supports a top member 94. The rim member 92 is formed in the shape of a ring and is adapted to rest along the upper edge of the container 22 as the planter 20 is suspended from an elevated support. In the depicted planter 20, the cable members 84 of the cable system 82 are intended to pass through preformed holes 96 provided in the top of the rim member 92 to help secure the rim member 92 in place atop the container 22 during use of the planter 20. In this connection, the ends of the cable members 84 (i.e. the cable member ends opposite the swivel-end) are each routed through a corresponding preformed hole 96 before being attached to the ring 62 sewn within the bag 40 for attachment thereto.

The top member 94, introduced above, of the planter 20 serves as a cover for the bag 40 and provides an access port through which water and fertilizer (i.e. liquid or granular) can be introduced into the top of the container 22. In this connection, the top member 94 includes a central, funnel-shaped section 98 for funneling water and fertilizer poured downwardly to a central opening 99. Furthermore, the top member 94 includes an outer edge 100 which can be accepted by the interior of the rim member 92 for support of the top member 96 atop the rim member 92.

It will be understood that water or fertilizer which is desired to be directed into the planter 20 for the purposes of watering and feeding the plants grown within the container 22 is poured into the funnel-shaped section 98 of the top member 94 and is thereafter permitted to flow downwardly into the dirt or potting soil contained within the container 22 by way of the central opening 99 of the top member 94.

Figure 5:
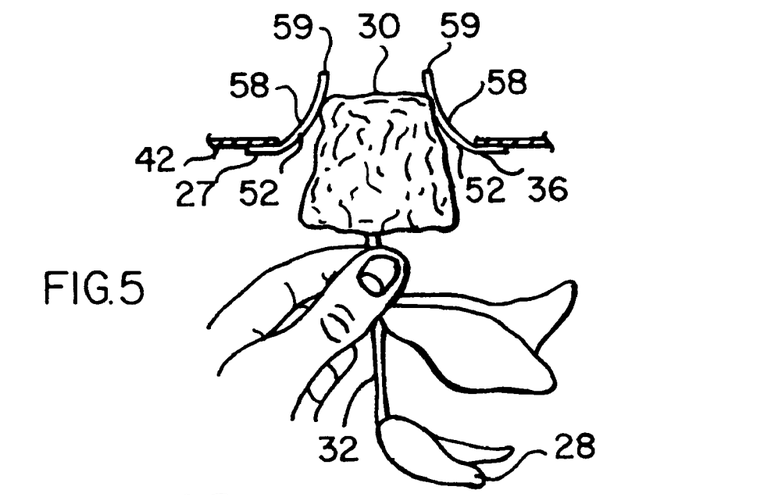
FIGS. 5-7 are views which illustrate the sequential steps involved in transplanting the plant of FIG. 2 through the planter grow port provided in the bottom of the FIG. 1 planter.

To transplant a plant 28 into the bottom grow port 36 of the planter 20, a plant 28 is grasped by the stem 32 (as illustrated in FIG. 5) and directed root-end-first upwardly through the center of the grow port 36 until the root system 30 moves past and thereby clears the tips 59 of the end sections 58 of the finger portions 52 of the retainer member 27 associated with the grow port 36. It will be understood that as the root system 30 of the plant 28 is urged against the finger portions 52, the finger portions 52 or, more specifically, the end sections 58 thereof, are permitted to flex inwardly of the container 22 (from the FIG. 4 unflexed condition) to expand the size of the expandable opening 19 and to thereby accommodate the movement, or passage, of the root system 30 into the container interior.

Figure 7:
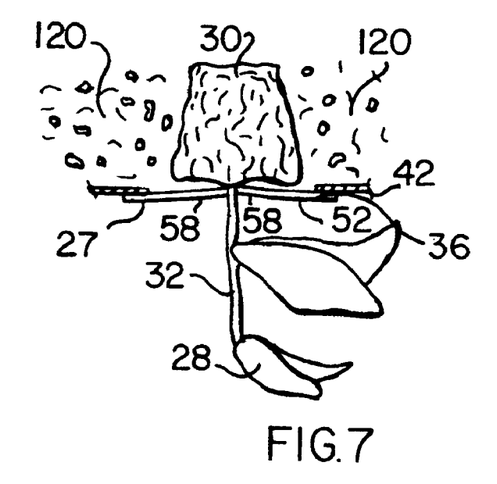

After the root system 30 of the plant 28 is moved far enough into the interior of the bag 40 (i.e. past the tips 59), the finger portions 52 (due to the inherent resiliency of the finger portions 52) are permitted to spring back toward the relaxed, or unflexed, condition, as illustrated in FIG. 7, at which the tips 59 of the finger portions 52 are permitted to contact and bear against the stem 32 of the plant 28. With the finger portions 52 in contact with the plant stem 32 as depicted in the FIG. 7 condition, the finger portions 52 are arcuate in shape, rather than perfectly flat, as a path is traced radially outwardly along the finger portions 52 from the tips 59 thereof.

If desired and following the return of the finger portions 52 toward the FIG. 7 condition, it may be desirable that the stem 32 be pulled outwardly of the container 22 a short distance to move the root system 30 closer to, or even into contact with, the inwardly-facing sides of the finger portions 52 and to thereby position most of the plant stem 32 external of the container 22. If such a movement of the stem 32 is desired, it may be necessary to manually spread the finger portions 52 apart (to thereby relieve pressure upon the plant stem 32 by the tips 59) and manually pull the stem 32 outwardly through the grow port 36 by a short distance to a desired position of rest before releasing the finger portions 52 from the spread-apart condition. Because the tips 59 of the finger portions 52 are rounded, no damage to the plant 28 is likely to result as a consequence of the contact between the tips 59 of the finger portions 52 and the stem 32.

With the finger portions 52 positioned about and in contact with the plant stem 32 when in the arcuate condition illustrated in FIG. 7, the finger portions 56 resist further movement of the tips 59 toward the planar condition of FIG. 4. Such a resistance to movement of the root system 30 out of the container interior through the retainer 27 is believed to be due, at least in part, to the fact that forces which must be exerted upon the plant 28 to urge the root system 30 outwardly through the retainer member 27 are exerted upon the finger portions 52 (by way of the root system 30 or stem 32) as forces which tend to compress the finger portions 52 along the length thereof (i.e. radially outwardly along the finger portions 52 from the tips 59 thereof).

Figure 6:
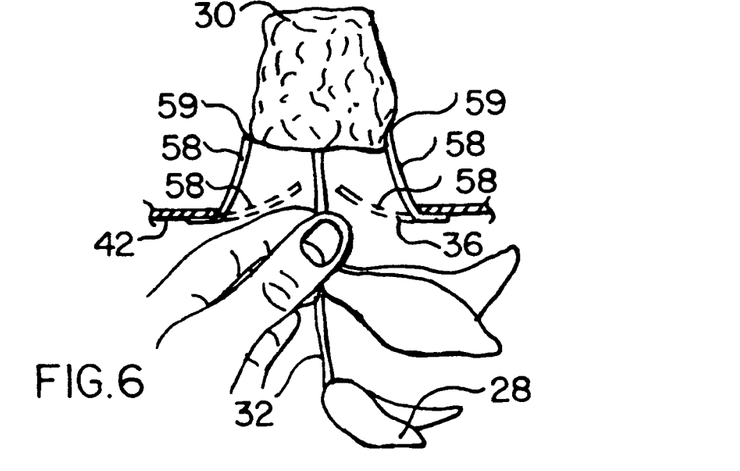

In other words and although the finger portions 52 can be moved (i.e. flexed) with relative ease from the FIG. 4 planar condition toward the FIG. 6 solid-line condition during which forces are urged along paths which are substantially normal to the exterior face of the retainer member 27, forces which tend to compress the finger portions 52 along the length thereof (i.e. in a radially-outward direction from the tips 59 thereof) are resisted by the finger members 52. Consequently and because the finger members 52 resist forces of a compressive nature which would be required to move the finger members 52 from the FIG. 7 arcuate condition toward (and past) the perfectly flat condition depicted in solid lines of FIG. 4, the finger members 52 resist the withdrawal of the plant root system 30 through the retainer member 27 from the container interior and thereby hold the plant 28 in place through the bottom grow port 36 with little likelihood that the plant 28 will fall out of the port 36. Thus, the retainer member 27 operates to permit the plant root system 30 to be passed with relative ease in one direction through the retainer member 27

(i.e. from the exterior of the container 22 to the interior thereof) but, upon passage of the root system 20 through the retainer member 27 into the container interior, resists the withdrawal of the root system 27 out of the container interior through the retainer member 27.

Once the plant 28 is positioned in place within the grow port 36 as aforedescribed, dirt or suitable potting soil, indicated 120 in FIG. 7, can be thereafter placed into the container 22 and positioned (e.g. loosely packed) about the root system 30 of the plant 28 (as illustrated in FIG. 7) so that the added dirt or potting soil 120 is positioned about, and thereafter contributes further to the support of the plant 28 within the container 22.

Figure 9:
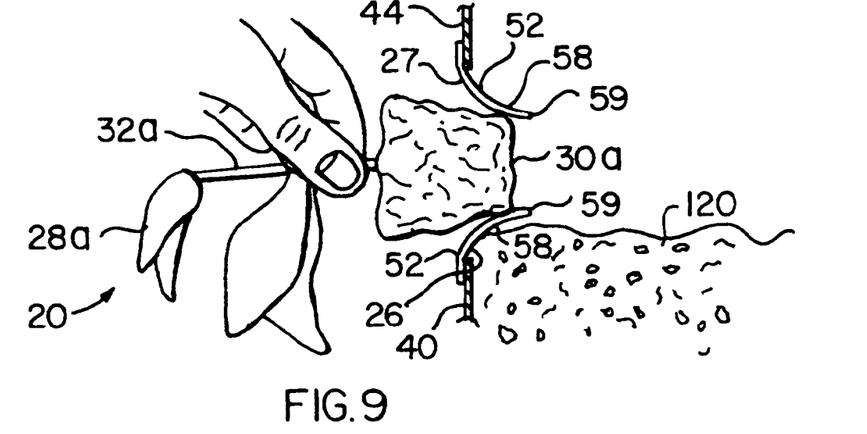
FIGS. 9-12 are views which illustrate the sequential steps involved in transplanting a plant like that of the FIG. 2 plant through a planter grow port provided in the side of the FIG. 1 planter.
Figure 10:
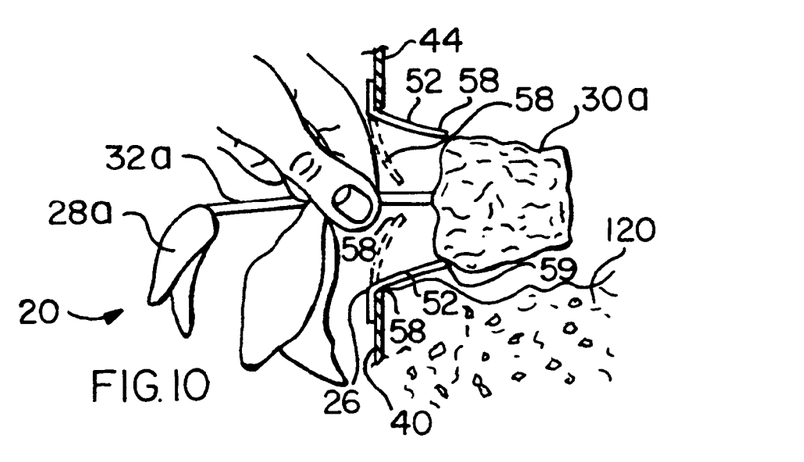
Figure 11:
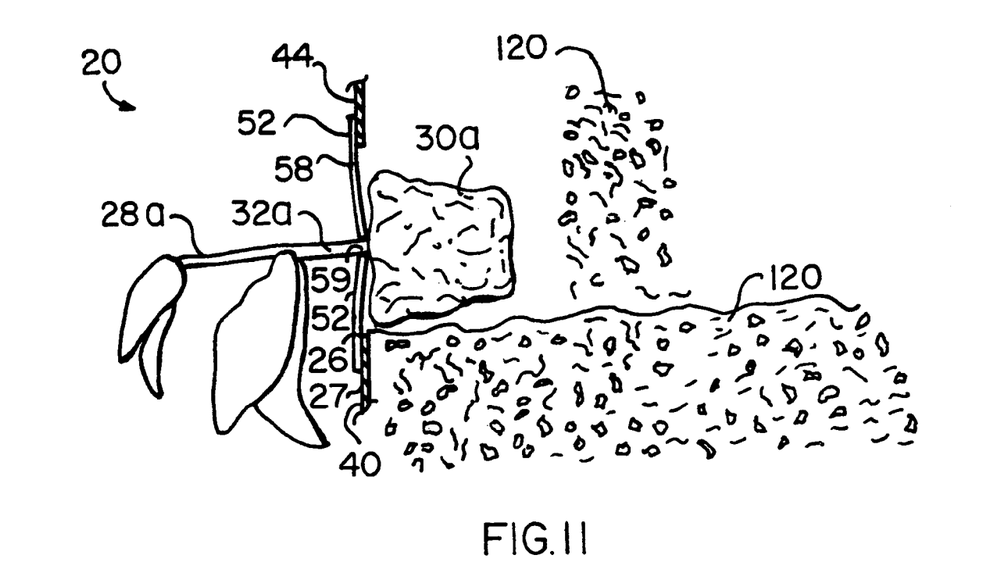

With reference to FIGS. 9 to 12 and to transplant a plant 28a (whose stem 32a and root system 30a are identical with the stem 32 and root system 30, respectively, of the plant 28 of FIG. 2) into a side grow port 26 of the planter 20, dirt or suitable potting soil, indicated 120 in FIG. 9, is placed within the container 22 of the planter 20 until the horizontal level of the dirt or potting soil placed within the planter 20 reaches to about the horizontal level of the lower edge of a side grow port 26. It follows that if a plant 28a is desired to be transplanted through each side grow port 26 of the planter 20, then the dirt or potting soil 120 is first placed within the container 22 only until it reaches to about the level of the lower edge of the lowermost side grow port 26. At that point, a plant 28a is grasped by the stem 32 (as illustrated in FIG. 9) and directed root-end-first through the center of the lowermost side grow port 26 until the root system 30a clears the tips 59 of the finger portions 52 of the retainer member 27 surrounding the side opening associated with the side grow port 26. It will be understood that as the root system 30a of the plant 28a is urged against the finger portions 52, the finger portions 52 are permitted to flex inwardly of the container 22 to accommodate the passage of the root system 30a through the expanded opening 19 of the retainer member 27. After the root system 30 of the plant 28 moves far enough into the interior of the bag 40 to clear the tips 59 of the finger portions 52, the finger portions 52 are permitted to spring back toward the relaxed, or unflexed, condition, as illustrated in FIG. 11, at which the tips 59 of the finger portions 52 are permitted to contact and bear against the stem 32a of the plant 28a. Because the tips 59 of the finger portions 52 are rounded, no damage is likely to result to the plant 28a from its contact with the tips 58 of the finger portions 52.

The aforediscussed reasons that the finger portions 52 resist withdrawal of the plant root system 30 through the bottom grow port 36 apply to the side grow ports 26 as well. In other words and as best viewed in FIG. 11, with the finger portions 52 positioned about and in contact with the plant stem 32, the finger portions 52 assume an arcuate condition so that any forces which might be exerted upon the plant 28a to urge the root system 30a outwardly through the retainer member opening 19 tend to compress the finger portions 52 (by way of the root system 30a or stem 32a) along the length thereof (i.e. radially outwardly along the finger portions 52 from the tips 59 thereof). Consequently and because the finger members 52 resist forces of a compressive nature which would be required to move the finger members 52 from the FIG. 11 arcuate condition toward (and past) the perfectly flat condition depicted in FIG. 8, the finger members 52 resist the withdrawal of the plant root system 30a from the container interior through a side grow port 26 and thereby hold the plant 28a in place through the side grow port 26.

Figure 12:
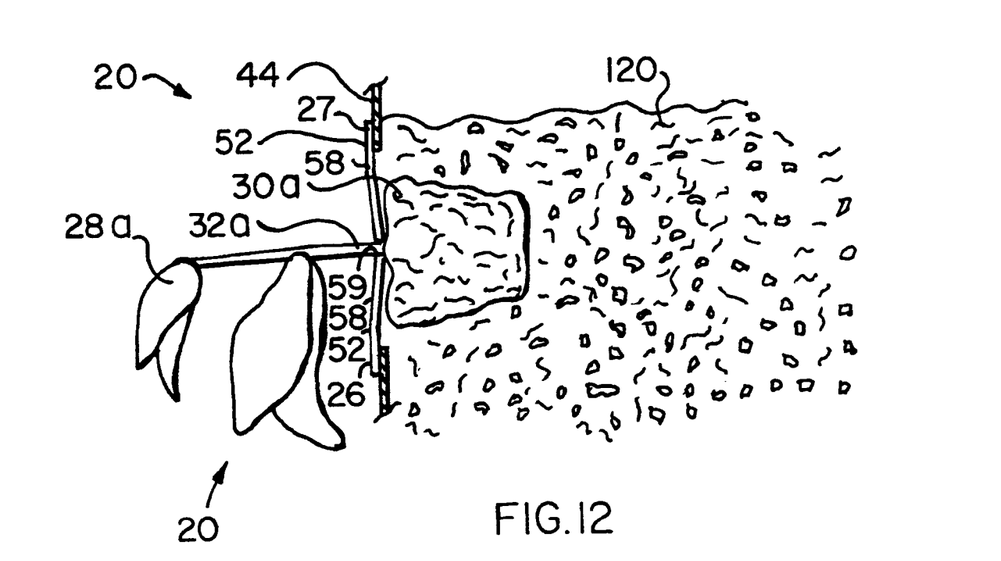

Once the plant 28a is held in place through the grow port 26, the user can release the stem 32a of the plant 28a and the container 22 can continue to be filled with dirt or suitable potting soil. More specifically, dirt or suitable potting soil 120 can thereafter be placed into the container 22 (as illustrated in FIG. 12) and positioned about the root system 30a of the plant 28a so that the added dirt or potting soil 120 contributes further to the support of the plant 28a within the container 22. The aforedescribed steps of placing dirt or potting soil 120 into the container 22 to about the (horizontal) level of the next-highest side grow port 26, directing a plant 28a root-end-first through the grow port 26 so that the finger portions 52 hold the plant 28 within the grow port 26, and then placing dirt or potting soil 120 around the root system 30a of the plant 28a being transplanted are repeated, as necessary or as desired, until a plant 28a is positioned within each side grow port 26 for growth out of the sides of the container 22. Additional potting soil 120 can thereafter be positioned within the interior of the container 22 to fill any vacant space remaining therein.

As a retained plant is permitted to grow within its container and its stem increases in diameter, the tips 59 of the fingers portions 52 are permitted to flex outwardly to accommodate the increase in size of the plant stem. Thus, the plant retaining means 18 associated with the aforedescribed grow ports 26 or 36 is not believed to retard or harm the growth of the plant as, for example, its stem enlarges, and the plant retaining means 18 is further advantageous in this respect.

Figure 13:
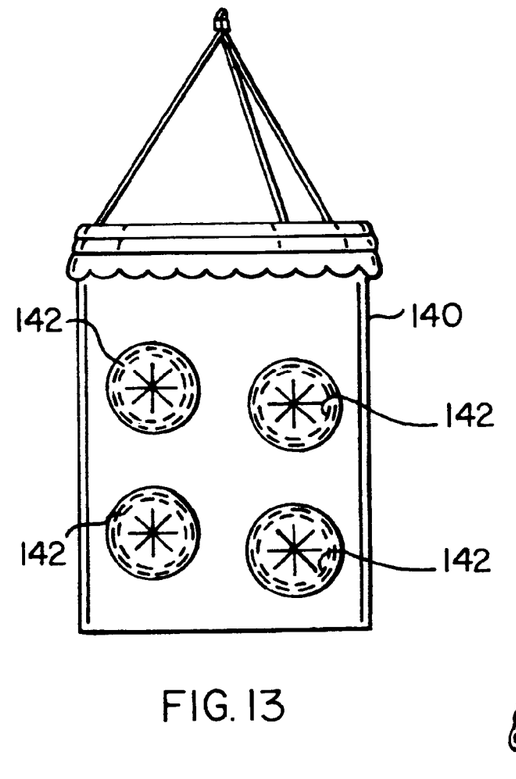
FIGS. 13 and 14 are side views of alternative embodiments of planters which embody features of the present invention.
Figure 14:
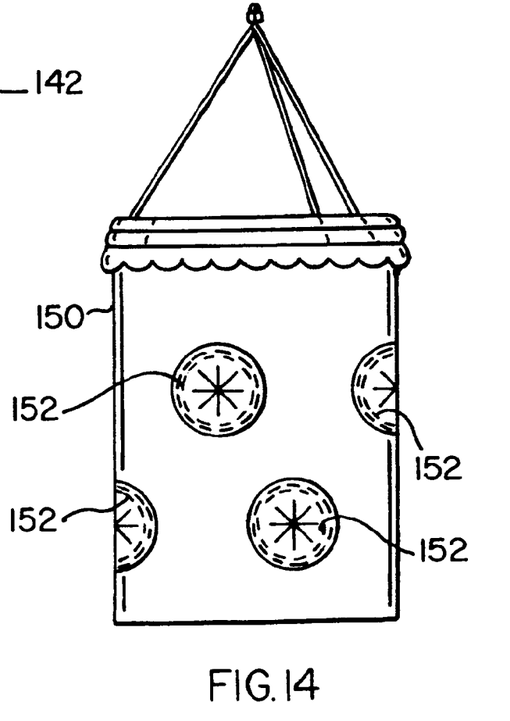

It will be understood that numerous modifications and substitutions can be had to the aforedescribed embodiment 20 without departing from the spirit of the invention. For example, although the aforedescribed planter 20 has been shown and described as including grow ports 26, 36 in the sidewalls and bottom of the container 22, it will be understood that alternative embodiments of this invention may include grow ports in only the sidewalls thereof or may include grow ports in only the bottom thereof. Furthermore, there are illustrated in FIGS. 13 and 14 alternative embodiments of containers of various shapes and sizes and which incorporate features of the present invention. In particular, there is depicted in FIG. 13 a container 140 having eight grow ports 142 (only four shown in FIG. 13) defined in the sidewalls thereof wherein the grow ports 142 are arranged in two rows around the container 140, and each grow port 142 of the top row is vertically disposed above a grow port 142 of the bottom row. Furthermore, there is depicted in FIG. 14, a container 150 having eight grow ports 152 (only four shown in FIG. 14) defined in the sidewalls thereof wherein the grow ports 152 are arranged in two rows around the container 140, and each grow port 152 of the top row is vertically staggered with respect to the grow ports 152 of the bottom port 152.

Figure 15:
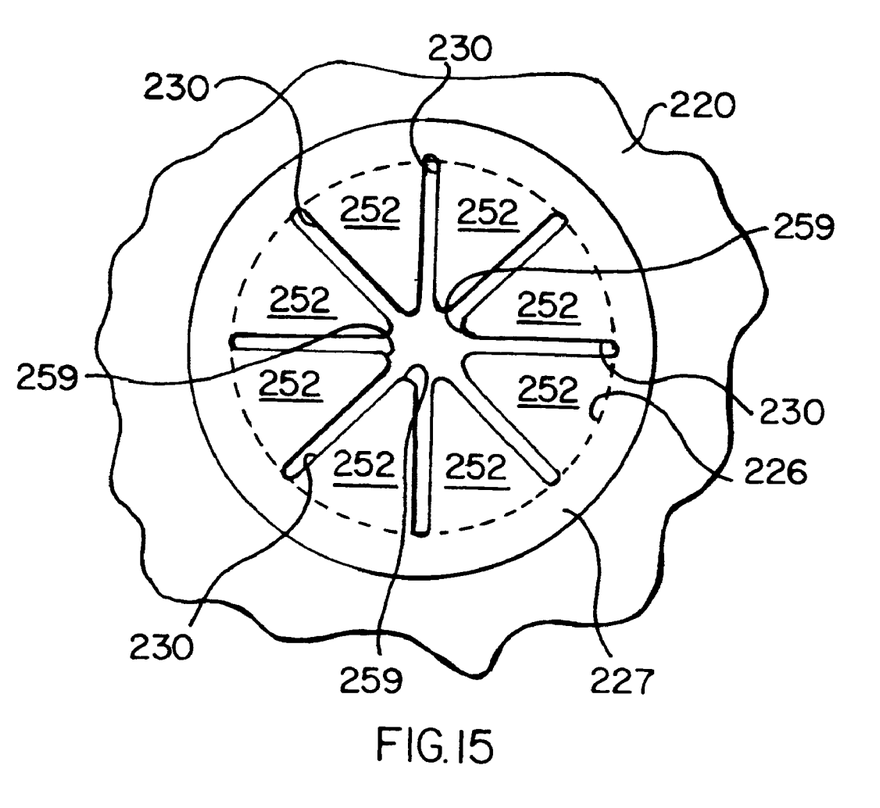
FIG. 15 is a fragmentary side view of a container showing an exemplary retainer for covering a grow port of the container.

Still further and by way of example, there is illustrated in FIG. 15 an alternative container 220 embodying features of the present invention and including a grow port 226 having a diameter of about 3.0 inches and a circular retainer member 227 associated with, or covering, the grow port 226. The retainer member 227 includes eight finger portions 252 regularly spaced therearound, and each finger portion 252 is spaced from its adjacent finger portion 252 by a gap 230 having a width of about 0.105 inches. The overall diameter of the retainer member 227 is about 3.75 inches, and each gap 230 as measured across the retainer 227 is about 3.212 inches in length. In addition, the central opening of the retainer member 227 as defined between the tips 259 of the finger portions 252 (when in a relaxed, or unflexed, condition), is about 0.727 inches in diameter. Still further, the retainer member 227 is comprised of Vinyl and has a thickness of about 0.025 inches. It will be understood, however, that retainer members of alternative sizes (i.e. having a diameter, for example, between about one inches and about five inches) can be had.

Further still, although the retainer members 27 of the aforedescribed embodiments have been shown and described as being formed from relatively thin pieces of sheet material, the retainer members may take alternative forms. For example, a retainer member in accordance with this invention can be formed as a molded element which provides the retainer member with a substantial thickness.

Yet still further, although the retainer members 27 of the aforedescribed embodiments have been shown and described as separately-identifiable components which have been joined to the container of a planter so as to substantially cover the grow ports provided therein, a retainer member in accordance with the broader interests of the present invention can be integrally formed as part of the container. For example, there is illustrated in FIG. 16 a planter 320 having a container 322 provided with a bottom 342 and sidewalls 344, and there are associated with the sidewalls 344 plant retaining sections, indicated 327, wherein each section 327 provides both a side grow port and an expandable opening 319 through which a plant can be transplanted into the container 322.

Figures 16, 17, 18:
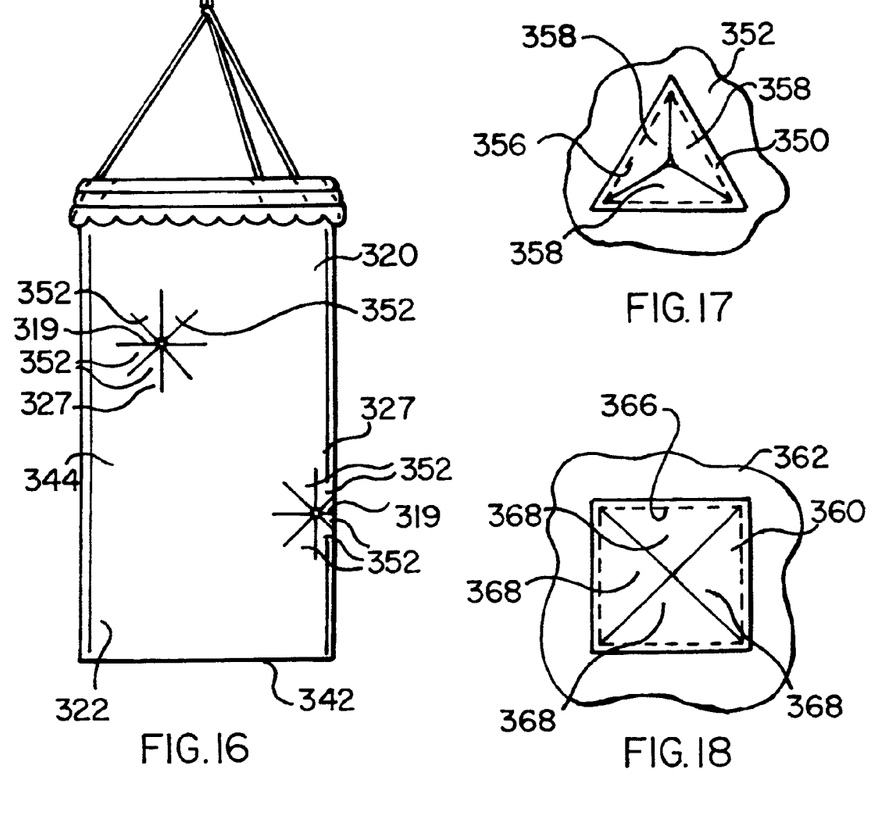
FIG. 16 is a perspective view of a still another alternative planter within which features of the invention are embodied.
FIG. 17 is a side view of a fragment of yet still another planter within which a triangular-shaped retainer member is incorporated.
FIG. 18 is a side view of a fragment of one more planter within which a square-shaped retainer member is incorporated.

In the FIG. 16 embodiment 320, each retaining section 327 is incorporated within the sidewalls 344 of the container 322 and includes a plurality of wedge-shaped finger portions 352 having small ends, or tips, which extend inwardly (e.g. radially inwardly) of the retaining section 327 from an outer periphery of the retaining section 322. The material comprising the sidewalls 344 provides the finger portions 352 with a sufficient degree of resiliency and flexibility so that by urging a plant root-system first against the center of a retaining section 322 from the exterior of the container 322, the finger portions 352 which define the expandable opening 319 are splayed, or moved, to a flexed condition from a normally-collapsed (e.g. planar) condition to permit the root system to pass through the expandable opening 319 into the container interior and so that upon passage of the root system through the expandable opening 319, the flexed finger portions 352 are permitted to return toward the normally-collapsed condition about the stem of the transplantable plant to thereby prevent the withdrawal of the root system of the plant through the retaining section 327 from the container interior.

Moreover and although each retainer member 27 of the aforedescribed embodiment of FIGS. 1 and 3-12 has been shown and described as having a circular outer edge, retainer members can take any of a number of alternative shapes in accordance with the broader aspects of the present invention. For example, there is illustrated in FIG. 17 a triangular-shaped retainer member 350 which can be attached to a sidewall or bottom of a container 352 so as to substantially cover a triangular-shaped grow port 356 provided therein, and there is illustrated in FIG. 18 a square-shaped retainer member 360 which can be attached to a sidewall or bottom of a container 362 so as to substantially cover a square-shaped grow port 366 provided therein. In the retainer member 350 of the FIG. 17 embodiment, there are provided three finger members 358 whose tips are directed inwardly of the member 350 from the three side edges thereof, and in the retainer member 360 of the FIG. 18 embodiment, there are provided four finger members 368 whose tips are directed inwardly of the member 360 from the four side edges thereof.

Accordingly, the aforedescribed embodiments are intended for the purpose of illustration and not as limitation.

The invention claimed is:

1. In a planter in which a transplantable plant having a stem and a root system is desired to be transplanted for growth and wherein the planter includes a container defining a sidewall or a bottom and an interior, the improvement characterized in that:

there is incorporated within the sidewall or the bottom of the container a means for retaining the root system of a plant which has been transplanted within the container, the retaining means constructed of a resiliently-flexible material and defining an expandable opening which is movable between an expanded condition and a normally-collapsed condition and which is biased by the resiliency of the material of the retaining means from the expanded condition toward the normally-collapsed condition so that by urging a transplantable plant root system-first against the plant retaining means from the exterior of the container, the expandable opening is moved to an expanded condition from its normally-collapsed condition to permit the root system to pass through the expandable opening into the container interior and so that upon passage of the root system through the expandable opening, the expandable opening is permitted to return toward its normally-collapsed condition due to the resiliency of the material of the retaining means about the stem of the transplantable plant to thereby prevent the withdrawal of the root system of the plant through the plant retaining means from the container interior.

2. The improvement as defined in claim 1 wherein the expandable opening is defined by a body of resiliently flexible material having portions which are movable between an unflexed condition at which the expandable opening is substantially closed and a flexed condition at which the expandable opening is in a condition so as to permit the root system of the plant to pass through the expandable opening.

3. The improvement as defined in claim 2 wherein the expandable opening has an axis along which the root system is permitted to travel as it is urged against the body of resiliently flexible material and wherein the movable portions of the body of resiliently flexible material are provided by finger portions having tips which are biased toward the unflexed condition and which are adapted to be flexed axially of the expandable opening when the root system is urged against the finger portions of the resiliently flexible material.

4. The improvement as defined in claim 3 wherein the finger portions are adapted to move into contact with the stem of the plant after the plant root system has passed through the expandable opening in a manner which resists the withdrawal of the root system through the expandable opening.

5. The improvement as defined in claim 4 wherein the finger portions are arranged substantially in a planar arrangement when in the unflexed condition and which are configured so that after the plant root system has passed through the expandable opening and the finger portions are permitted to return toward the unflexed condition, the finger portions move into contact with the stem of the plant and are thereby prevented from returning to the planar arrangement of the unflexed condition.

6. The improvement as defined in claim 1 wherein the expandable opening of the retainer member has a center from which the opening expands when the root system of a transplantable plant is urged thereagainst and toward which the opening is permitted to return upon passage of the root system through the expandable opening, and the center of the expandable opening is disposed substantially centrally of the retainer means.

7. The improvement as defined in claim 6 wherein the expandable opening of the retainer means has edges disposed inwardly of the retainer means and encircling the center of the expandable opening, and the inwardly-disposed edges are adapted to engage the stem of the plant when the expandable opening is permitted to return toward its normally-collapsed condition about the stem of the plant to thereby prevent the withdrawal of the root system of the plant through the plant retaining means from the container interior.

8. The improvement as defined in claim 7 wherein the expandable opening is defined by a body of resiliently flexible material having portions which are movable between an unflexed condition at which the expandable opening is substantially closed and a flexed condition at which the expandable opening is in a condition so as to permit the root system of the plant to pass through the expandable opening, and the inwardly-disposed edges are provided by the movable portions of the expandable opening, and the movable portions are regularly disposed about the center of the expandable opening.

9. The improvement as defined in claim 8 wherein the expandable opening has an axis along which the root system is permitted to travel as it is urged against the body of resiliently flexible material and wherein the movable portions of the body of resiliently flexible material are provided by finger portions having tips which are biased toward the unflexed condition and which are adapted to be flexed axially of the expandable opening when the root system is urged against the finger portions of the resiliently flexible material.

10. The improvement as defined in claim 9 wherein the finger portions are adapted to move into contact with the stem of the plant after the plant root system has passed through the expandable opening and are adapted to resist forces of a compressive nature exerted upon the finger portions so that attempted withdrawal of the plant from the expandable opening along said axis is opposed by the finger portions.

11. The improvement as defined in claim 9 wherein the finger portions are arranged substantially in a planar arrangement when in the unflexed condition and which are configured so that after the plant root system has passed through the expandable opening and the finger portions are permitted to return toward the unflexed condition, the finger portions move into contact with the stem of the plant and are thereby prevented from returning to the planar arrangement of the unflexed condition.

12. A planter for growing a transplantable plant having a root system and a stem which extends from the root system, the planter comprising:
  a container defining a sidewall or a bottom and an interior, and the sidewall or the bottom having a grow port defining an opening therein; and
  a plant retaining means associated with the grow port of the container for retaining a plant desired to be transplanted within the container through the grow port, the retaining means including a plurality of resiliently-flexible finger portions which are regularly spaced about the opening of the grow port and which are biased substantially inwardly of the grow port due to the resiliency of the finger portions toward an unflexed condition and are adapted to be flexed to a flexed condition which permits the root system of a plant desired to be transplanted within the planter to be inserted through the grow port as the plant root system is urged against the finger portions from the exterior of the container and, after passage of the plant root system through the plant retaining means, are permitted to return toward the unflexed condition due to the resiliency of the finger portions about the stem of the plant to prevent the withdrawal of the root system from the container interior through the grow port.

13. The planter as defined in claim 12 wherein each of the finger portions have tips which are directed substantially inwardly of the grow port and the resiliency of the finger portions permit the tips to be moved from a unflexed condition at which the tips of the finger portions are substantially co-planar with one another and a flexed condition at which the tips of the finger portions are disposed at least partly within the interior of the container to accommodate the insertion of the root system of the plant into the container through the grow port as the finger portions are permitted to flex between the unflexed and flexed condition and so that upon movement of the plant root system past the tips of the finger portions during insertion of the plant root system into the container through the grow port, the finger portions are permitted to return toward the unflexed condition.

14. The planter as defined in claim 13 wherein each of the finger portions is relatively flat when in its unflexed condition and has side edges which converge toward one another as a path is traced toward the tip of the finger portion.

15. The planter as defined in claim 14 wherein the tip of each finger portion is rounded to reduce the likelihood of damage to the plant stem when contacted by the tips of the finger portions.

16. The planter as defined in claim 12 wherein the plant retaining means includes at least three finger portions.

17. The planter as defined in claim 12 wherein the plant retaining means includes a piece of resilient sheet material having an outer circumferential edge and which is joined to the sidewall or the bottom so as to substantially surround the grow port opening defined therein, and each of the finger portions is provided by a section of the sheet material.

18. The planter as defined in claim 17 wherein the sheet material is joined to the sidewall or bottom of the container with stitches which extend along the outer circumferential edge of the sheet material.

19. The planter as defined in claim 12 wherein the container has a sidewall and the grow port is defined in a sidewall of the container.

20. The planter as defined in claim 12 wherein the container has a bottom and the grow port is defined in the bottom of the container.

21. The planter as defined in claim 12 wherein the plant retaining means is a first plant retaining means, the grow port is a first grow port and the container includes a second grow port having an opening defined in the sidewall or the bottom of the container, and the planter further includes
  a second plant retaining means associated with the second grow port for retaining a plant desired to be transplanted within the container through the second grow port, the second plant retaining means including a plurality of resiliently-flexible finger portions which are regularly spaced about the opening of the second grow port which are biased substantially inwardly of the second grow port and are adapted to be flexed to a condition which permits the root system of a plant desired to be transplanted within the planter through the second grow port as the plant root system is urged thereagainst from the exterior of the container and which, upon passage of the plant root system through the second plant retaining means, returns toward the unflexed condition due to the resiliency of the finger portions about the stem of the plant to prevent the withdrawal of the root system from the container interior through the second grow port.

* * * * *

UNITED STATES PATENT AND TRADEMARK OFFICE
CERTIFICATE OF CORRECTION

PATENT NO. : 7,845,112 B2
APPLICATION NO. : 12/655429
DATED : December 7, 2010
INVENTOR(S) : Wilson A. Felknor It is certified that error appears in the above-identified patent and that said Letters Patent is hereby corrected as shown below:

Title Page Item [60] under heading "Related U.S. Application Data" should read:

Division of application No. 12/322,904, filed on Feb. 9, 2009, now Pat. No. 7,669,366.
Provisional application No. 61/123,772, filed April 12, 2008.

Column 1, between lines 8 and 9, insert the following paragraph:

--The benefit of Provisional Application Ser. No. 61/123,772, filed April 12, 2008 and entitled PLANTER FOR GROWING A PLANT FROM THE SIDE THEREOF, is hereby claimed.

Signed and Sealed this
Twenty-sixth Day of April, 2011

David J. Kappos
*Director of the United States Patent and Trademark Office*